(12) United States Patent
Rodemer et al.

(10) Patent No.: US 7,092,744 B2
(45) Date of Patent: Aug. 15, 2006

(54) HANDS-FREE MICROPHONE MOUNTING

(75) Inventors: Klaus Rodemer, Lautertal (DE); Joerg Ohlenburger, Braunfels (DE)

(73) Assignee: paragon AG, (DE)

( * ) Notice: Subject to any disclaimer, the term of this patent is extended or adjusted under 35 U.S.C. 154(b) by 691 days.

(21) Appl. No.: 09/904,288

(22) Filed: Jul. 12, 2001

(65) Prior Publication Data

US 2002/0037755 A1    Mar. 28, 2002

(30) Foreign Application Priority Data

Jul. 13, 2000    (DE) ................ 100 33 985

(51) Int. Cl.
| | |
|---|---|
| H04M 11/00 | (2006.01) |
| G10K 11/16 | (2006.01) |
| H03G 3/20 | (2006.01) |
| H04R 9/08 | (2006.01) |

(52) U.S. Cl. .............. 455/569.1; 455/569.2; 381/71.4; 381/110; 381/365

(58) Field of Classification Search ............... 381/365, 381/110, 71.4; 455/569.2, 569, 569.1; 280/735
See application file for complete search history.

(56) References Cited

U.S. PATENT DOCUMENTS

| 5,602,928 A * | 2/1997 | Eriksson et al. ........... 381/71.4 |
| 6,438,247 B1 * | 8/2002 | Cipolla et al. .............. 381/365 |
| 6,505,057 B1 * | 1/2003 | Finn et al. ................ 455/569.2 |
| 6,581,960 B1 * | 6/2003 | Schondorf et al. ........... 280/735 |
| 6,760,454 B1 * | 7/2004 | Shreve et al. ................ 381/110 |

FOREIGN PATENT DOCUMENTS

| DE | 24 46 837 A1 | 4/1976 |
| DE | 38 08 055 A1 | 9/1988 |
| DE | 40 10 815 A1 | 2/1991 |
| DE | 40 06 196 A1 | 8/1991 |
| DE | 41 08 192 A1 | 9/1992 |
| DE | 197 51 920 A1 | 5/1999 |
| JP | 59-38153 | 1/1984 |
| JP | 61-181738 | 8/1986 |
| JP | 63-284049 | 11/1988 |
| JP | 2001-71862 | 3/2001 |

* cited by examiner

*Primary Examiner*—Wing Chan
*Assistant Examiner*—Thjuan P. Knowlin
(74) *Attorney, Agent, or Firm*—Iandiorio & Teska

(57) ABSTRACT

In a microphone mounting for a hands-free system in automotive vehicles, the microphone is mounted on the seat belt. In one embodiment the microphone is seated in a sheath which is fastened to the upper belt deflection and through which the belt can freely pass. The sheath consists of two mutually displaceable flat sleeves, of which the lower one accommodates the microphone whose position relative to the passenger's mouth can be adjusted in an optimum way by a mutual displacement of the two sleeves. In another embodiment the microphone is provided at its side facing the belt with contacts that are brought into electrical contact with conducting wires integrated into the belt so as to be connected to the telephone circuit.

8 Claims, 2 Drawing Sheets

HANDS-FREE MICROPHONE MOUNTING

FIELD OF THE INVENTION

The present invention relates to a microphone mounting for a hands-free system in an automotive vehicle.

BACKGROUND OF THE INVENTION

The microphone arrangement in a hands-free system for automotive vehicles presents problems with respect to optimum speech communication because the microphone, on the one hand, should record the voice of the person speaking on the phone as clearly as possible and, on the other hand, record as little as possible undesired noise that is unavoidable in an automotive vehicle.

DE 197 51 920 A1 discloses such a hands-free system including a microphone carrier that is mounted in the vehicle and holds the microphone in the operative position near the head of the person talking on the phone. To this end there is provided a bridge which can be inserted between the two holding rods of the headrest and has seated thereon a gooseneck with a microphone that can be adjusted near the driver's mouth so that it is directly hit by the sound of the voice. When the driver is not talking on the phone, he can bend the gooseneck to the side and rearwards, so that he will not be irritated by the same.

Microphone mountings with arms or gooseneck microphones often have an irritating effect and it is troublesome to adjust their necessary optimum position each time. It has been suggested that a hands-free microphone should be mounted on the seat belt so that when the seat belt is fastened it will automatically pass into a position in which a clear speech communication is possible.

SUMMARY OF THE INVENTION

Therefore, it is the object of the present invention to provide a microphone mounting for a hands-free system in an automotive vehicle in the case of which the microphone need not be specifically moved into an operative position by special operations and might possibly irritate the driver, but when the vehicle is put into use it will automatically be moved into a position in which it can be used without any problems and without presenting any obstacle or being disturbing in another way.

This invention features a microphone mounting for a hands-free system in a vehicle having a seatbelt with a deflection triangle including a microphone, and a microphone carrier to hold the microphone in an operative position near the head of a person speaking on the phone, the microphone carrier connected to the seat belt of the automotive vehicle such that when the belt is fastened, the microphone rests in the neck-shoulder portion of the person.

The microphone carrier may be a sheath which is mounted on the deflection triangle of the seat belt and through which the seatbelt passes freely. The sheath may be formed by two flat sleeves each having a free end, the sleeves displaced relative to one another in telescopic fashion and fixed, one of the sleeves hinged at its free end to the deflection triangle, the microphone received on the other sleeve. The sleeves may be locked relative to one another by a snap-type device.

The microphone may have a directional characteristic whose sensitivity maximum in the operative position is directed towards the mouth of the person speaking on the phone. The microphone carriers may be provided on the seatbelts of a plurality of seats.

This invention also features a hands-free microphone for mounting on the seatbelt of a vehicle, wherein the microphone is provided at the portion of the microphone facing the seatbelt with contacts for contacting counter-contacts provided on the seatbelt and connected to conducting wires integrated into the seatbelt.

The hands-free microphone may include fastening plates arranged at both sides of the seatbelt and connected to one another through an opening in the seatbelt in a non-rotational manner with respect to the seatbelt, said counter-contacts mounted on the fastening plate at the microphone side and connected through said fastening plate to said conducting wires. The connection between the fastening plates may be a crimp connection. The counter-contacts may be formed by contact plates which are connected to the conducting wires by crimp lugs, the conducting wires guided out of the seatbelt through the fastening plate.

The microphone may include a cup-shaped housing which accommodates a microphone capsule, the microphone capsule formed in the bottom of the cup-shaped housing with a speech opening and which can be locked on the edge of the cup-shaped housing via a groove/bead connection to the fastening plate carrying the counter-contacts. The microphone contacts may be contact springs.

There may be a plurality of microphones are arranged along the seatbelt and connected to a selection circuit which selects the microphone for transmission that supplies the signals best suited for speech communication according to predetermined criteria. The selection circuit may include a microphone change-over switch, the position of which is defined by the belt extension length. The belt extension length may be determined by measuring the belt roll diameter or rotation angle.

Thanks to the installation of the microphone on the seat belt in accordance with the invention the microphone automatically moves—while the seat belt is being fastened—into a position in which it is located near the driver's mouth in an operative position without requiring an irritating arm-type construction or the like. When the belt is unfastened the microphone is suspended in the area of the door post (B-pillar) where it does also not present an obstacle and where it is protected in addition.

An expedient development of the invention consists in arranging the microphone in a sheath through which the belt passes so that it can be moved on the belt into the most advantageous position. It is of particular advantage when the sheath is fastened to the upper deflection triangle of the holding belt so that it does not slip at random on the belt. For adjusting the optimum position relative to the driver's mouth the sheath may be designed as a two-part construction in the manner of a telescope so that the microphone can be adjusted within an adjustment range by shortening or extending the telescope to the optimum position which can be fixed either by a correspondingly rigid guidance of the two telescope sleeves or by a locking device provided thereinbetween. The sleeves are advantageously of a flat rectangular cross-section matching the belt, so that they are hardly noticed and can be produced at low costs from a plastic material.

In another embodiment of the invention the use of metal filaments or strands woven into the belt offers the possibility of an expedient design of the microphone connection to the electronic circuit by arranging contacts on the bottom side of the microphone for establishing a conductive connection to the belt conductors. One design for such a connection is e.g.

that fastening plates, for instance made from a plastic material, are provided at both sides of the belt and that these are interconnected in a non-rotatable way relative to the belt through an opening provided in the belt. One of the fastening plates has mounted thereon contact plates which by way of openings provided in said fastening plate are brought into electrical contact with the belt conductors, e.g. by crimping the belt conductor ends to crimp lugs of the contact plates before these are fastened to the belt. The connection between the fastening plates is established in the manner of known belt stoppers, e.g. by means of tubular rivets which deform when the two fastening plates are pressed together, thereby establishing a reliable connection, or another crimp connection or plastics bond.

An expedient development of the invention further consists in accommodating the microphone capsule in a cup-shaped housing which in the bottom of the cup includes a voice opening through which the sound waves can pass to the diaphragm of the microphone, and which on the edge of the cup can be connected via a snap-type connection to the fastening plate carrying the contact plates. Such a snap-type connection may e.g. be a bead/groove connection between the edge of the cup and the edge of the fastening plate. Expediently, the microphone contacts are designed as spring contacts which when the cup housing is placed on the fastening plate are pressed against their contact plates and ensure a reliable contacting.

To achieve an optimum microphone position also in the case of drivers of different heights, a plurality of microphones may be provided in a further development of the invention along the seat belt, and it is possible with the help of an electronic selection means to determine—on the basis of the signals of said microphones and according to predetermined criteria—that microphone that supplies the speech signals best suited for transmission, and this microphone will then be chosen for the conversation.

Expediently, a suitable directional characteristic of the microphone is provided, optionally in combination with a corresponding sound guidance, by way of a suitable shape of the microphone housing or the sleeve in which the microphone is seated, so that the sensitivity maximum in the operative position is directed towards the mouth of the person talking on the phone. It has been found that interfering noise can be reduced by up to 18 dB with the arrangement according to the invention as compared to conventional installation sites of the microphone.

The microphone mounting according to the invention may be designed and intended as original equipment for an automotive vehicle, or as a retrofit kit for a hands-free system to be installed later. It can also be provided on several seats so that not only the driver, but also further passengers have a microphone in an advantageous position at their disposal, and the individual microphone signals can be mixed and processed in a suitable electronic system (e.g. including a noise suppression system or further signal processing circuits).

The microphone mounting according to the invention is however suited not only for automotive vehicles, but also for other fields of application in which e.g. a machine operator operates a building machine, a crane, a manufacturing system or whatever from a seat and wants to communicate with another place via a hands-free system.

BRIEF DESCRIPTION OF THE DRAWINGS

The invention shall now be explained in more detail with reference to an embodiment illustrated in the attached drawings, in which.

DETAILED DESCRIPTION OF THE INVENTION

Figure 1:
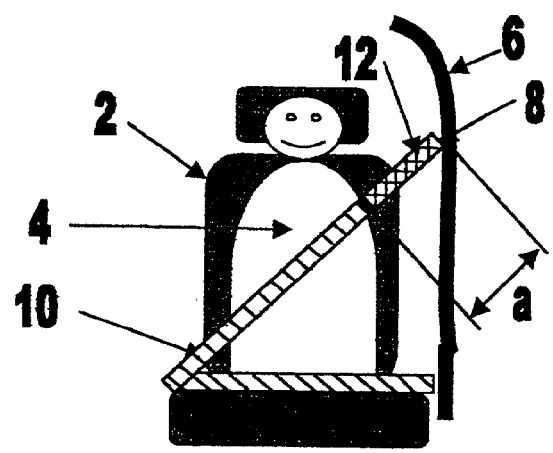
FIG. 1 is a schematic representation of a car seat with a driver having his seat belt fastened, with the microphone mounting moving the microphone into the operative position near the neck/head.

FIG. 1 illustrates a car seat 2 on which a schematically illustrated driver 4 is seated. A belt deflection 8 for a seat belt 10 drawn in the buckled position is located approximately at shoulder height on the B-pillar 6 behind the front door section.

At the upper end of the belt 10 a sheath 12 is positioned on the belt at the belt deflection 8, the sheath 12 being fastened with its upper end to the belt deflection 8 and containing a microphone 14 in its lower portion.

Figure 2:
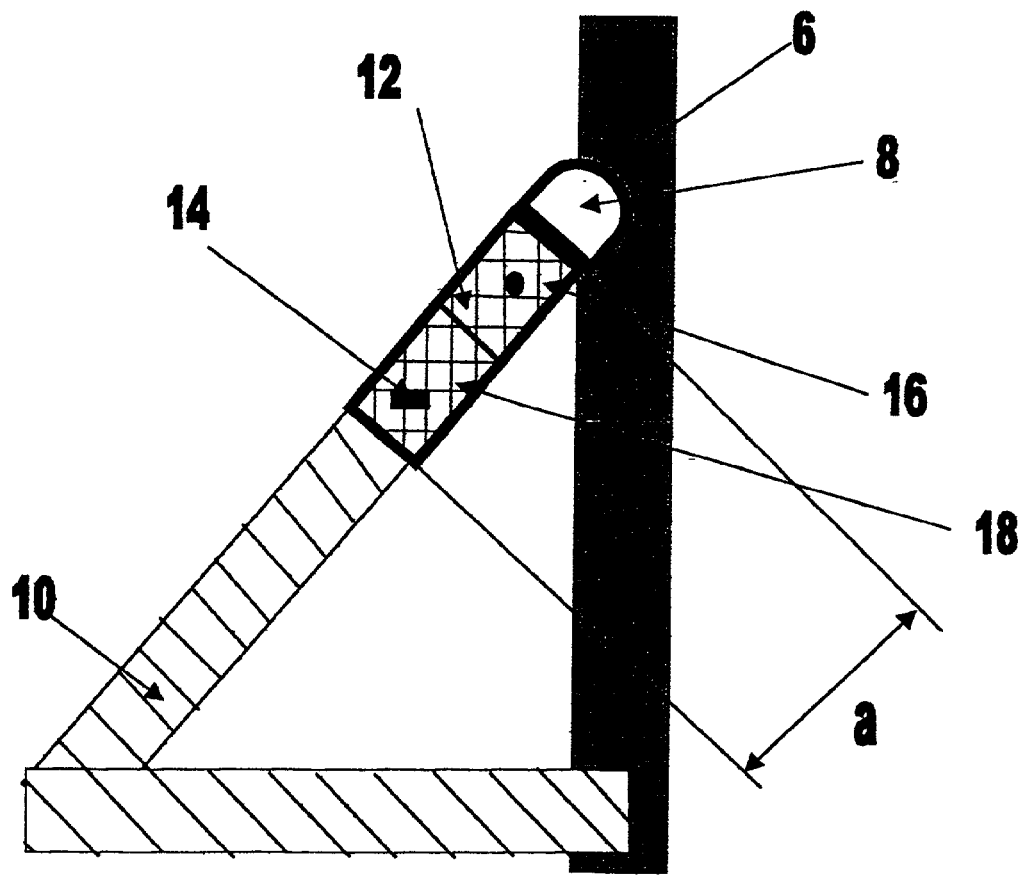
FIG. 2 is an enlarged detail view of an embodiment of the microphone mounting according to the invention.

Details of the construction are shown in FIG. 2. In the illustrated embodiment sheath 12 consists of two sleeves 16 and 18, of which the upper sleeve 16 is fastened in a suitable manner to the deflection angle or fitting of the belt deflection 8 so that the safety belt arriving from the belt roll at the bottom freely passes through the sleeves of the sheath after deflection, i.e. it can be unrolled or drawn out without any impediment, the sheath being retained at the deflection angle. The lower sleeve 18 can be displaced relative to the upper sleeve 16 and adjusted to a distance a at which the microphone 14 assumes the most advantageous position relative to the driver's mouth. The sleeve length adjusted in this way can be fixed by a locking means (not shown) between sleeves 16 and 18. The two sleeves 16 and 18 could also be connected to one another by an adjustable bellows which permits an adjustment of the sheath length a and does not change the same independently.

In the fastened state of the belt the microphone 14 assumes its operative position in which in the case of a directional characteristic the sensitivity maximum is directed towards the mouth of driver 4 who is thereby not handicapped in any way because he does not at all notice the sheath with the microphone. When he unfastens the belt and while the same is rolling up, the belt freely passes through the sheath 12 and comes to rest on the B-pillar 6 together with the sheath 12. The microphone is then accommodated in a safe and protected manner and does not present an obstacle.

It goes without saying that the hands-free microphone can be installed according to the invention on each of the seat belts of a car, so that it is not only the driver who can use the microphone. The mounting operation, no matter on which belt, does not require any troublesome installation measures, but can be carried out relatively easily, e.g. when the sleeves are provided on the back side with a longitudinal slot for inserting the belt. Moreover, the microphone cable can be laid without any problems and in a protected way along the B-pillar without being subjected to any significant loads during operation.

Figure 3:
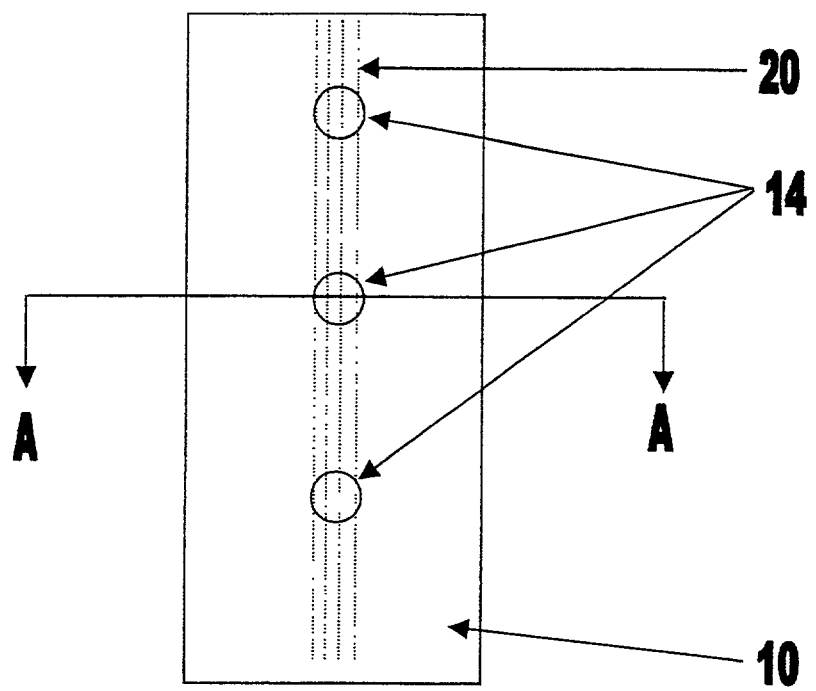
FIG. 3 shows a belt section along which three microphones are arranged.
Figure 4:
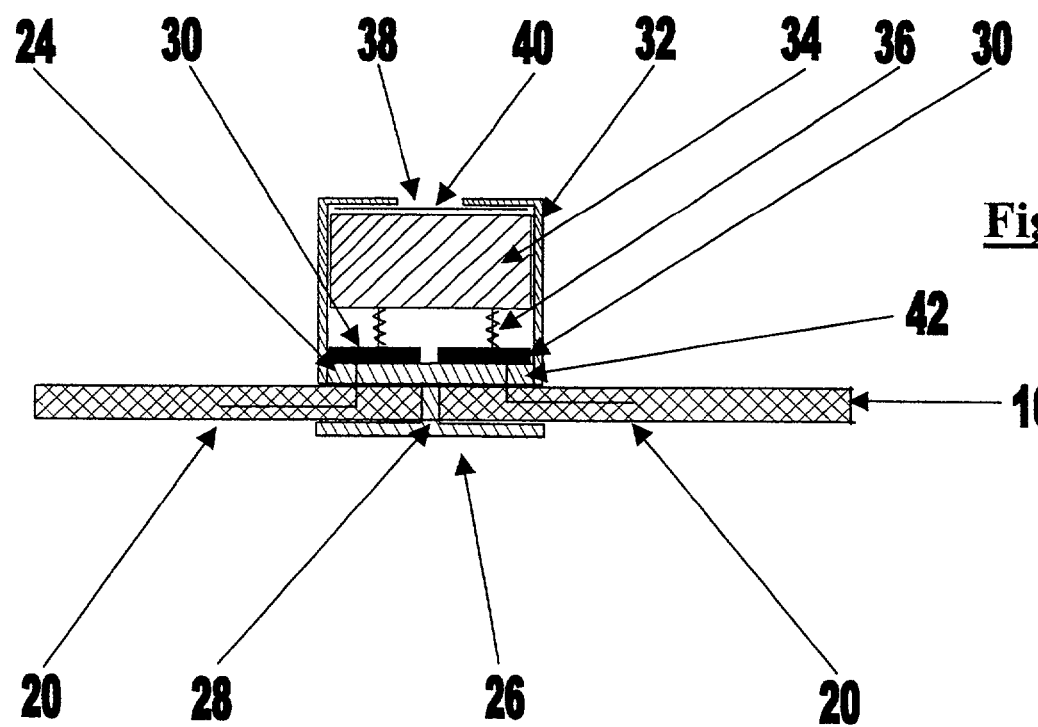
FIG. 4 is an enlarged cross-sectional view through the belt and a microphone along sectional line A—A in FIG. 3.

FIG. 3 shows a section of the belt 10 which in the illustrated embodiment has woven thereinto four metallic conductors 20 extending along the belt. Three microphones 14 that are secured to the belt in the way illustrated in FIG. 4 are arranged at a mutual distance in the illustrated embodiment. Position and mutual distance of the microphones 14 are chosen such that in the fastened state of the seat belt always one of the microphones is located in an optimum position relative to the driver's mouth and supplies the best suited voice signals.

Section A—A which is illustrated in FIG. 4 and taken through the belt shows an upper and a lower fastening plate 24 and 26, respectively, which are connected to one another and to the belt 10 in a non-rotational manner by way of a crimp connection 28 extending through an opening in the belt 10. Ends of the conductors 20 are guided through the upper fastening plate 24 and electrically connected to contact plates 30 by way of a crimp connection, which is here not shown in detail. The contact plates 30 are arranged on and secured to the upper side of the fastening plate 24.

A cup-shaped housing 32 accommodates a microphone capsule 34 from which two contact springs 36 project downwards and press against the contact plates 30 in the mounted state of the cup-shaped housing. The bottom of the cup-shaped housing 32 has formed therein an opening 38 which is covered by a felt 40 and forms a passage for sound waves to the diaphragm of the microphone capsule 34.

On its upper open edge the cup-shaped housing 32 carries a bead 42 which can snap into a surrounding groove on the edge of the upper fastening plate 24 when the cup-shaped housing 32 is pressed with the microphone capsule 34 onto the fastening plate. To guarantee the correct contact position between the contact springs 36 and the contact plates 30, a guide nose (not illustrated here) may be provided between the edge of the cup-shaped housing and the fastening plate 24.

To select the microphone 14 located in an optimum position relative to the person speaking as the active microphone among a plurality of microphones when the seat belt 10 has been fastened, a selection circuit (not specifically illustrated here) is provided and has connected thereto the individual microphones. In the case of the three microphones 14 shown in this instance the microphones are connected via four conductors 20, of which one is shared by all of the three microphones as the ground conductor, while a respective one of the three remaining conductors is intended for the second microphone connection. The signals appearing on said conductors are tested by the selection circuit according to specific criteria to find out which one of the microphones supplies the best suited speech signals, i.e. which one has the best position relative to the speaker's mouth, and this microphone is selected by the selection circuit as the active hands-free microphone. With a driver of a different height, another microphone might supply the best speech signals and will then be selected by the selection circuit for transmission.

Another possibility of selecting the microphones is based on the finding that tall drivers pull the seat belt to a further extent than small drivers and that the position of the various microphones relative to the driver's mouth changes with the belt extension length. Therefore, a relationship between the belt extension length and the optimally located microphone can be determined in vehicle-dependent test series. Since the belt extension length can be determined by sensing the belt roll diameter, the microphone can be selected for drivers of different builds with the help of a microphone change-over switch which is operated by a sensing lever for the belt diameter. A purely electronic switching by measuring the rotation angle of the belt roll is also possible.

Moreover, the invention has the considerable advantage that the microphone is automatically brought into the operative or inoperative position without any additional operations solely by fastening or unfastening the belt and without any bulky parts having to be put up with.

The invention claimed is:

1. A handfree-set for mounting on the safety belt of an automotive vehicle comprising: a microphone, said microphone provided at the side of the microphone facing the belt with contacts for contacting counter-contacts which are provided on the belt and connected to conducting filaments which are woven into the belt and are designed as connecting conductors in the form of metal filaments or strands which lead from said counter-contacts to an electronic circuit, and fastening plates arranged at both sides of the belt and connected to one another through an opening in the belt in a non-rotational manner with respect to the belt, said counter-contacts being mounted on the fastening plate at the microphone side and connected through said fastening plate to said conducting filaments.

2. The handfree-set according to claim 1, wherein the connection between said fastening plates is a crimp connection.

3. The handfree-set according to claim 1, wherein said counter-contacts are formed by contact plates which have connected thereto by way of crimp lugs said conducting filaments which are guided out of the belt through said fastening plate.

4. The handfree-set according to claim 1, wherein said microphone further includes a cup-shaped housing which accommodates a microphone capsule and which is formed in the bottom of said cup-shaped housing with a speech opening and which can be locked on the edge of the cup-shaped housing via a groove/bead connection to said fastening plate carrying said counter-contacts.

5. The handfree-set according to claim 1, wherein said microphone contacts are contact springs.

6. The handfree-set according to claim 1, wherein a plurality of microphones are arranged along the belt and connected to a selection circuit which selects that microphone for transmission that supplies the signals best suited for speech communication according to predetermined criteria.

7. The handfree-set according to claim 6, wherein said selection circuit comprises a microphone change-over switch, the position of which is defined by the belt extension length.

8. The handfree-set according to claim 7, wherein said belt extension length is determined by measuring the belt roll diameter or rotation angle.

* * * * *